Sept. 9, 1941.    E. KRAMAR    2,255,741
SYSTEM FOR DETERMINING NAVIGATORY DIRECTION
Filed April 29, 1939    2 Sheets-Sheet 1
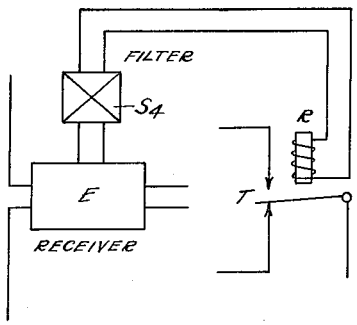
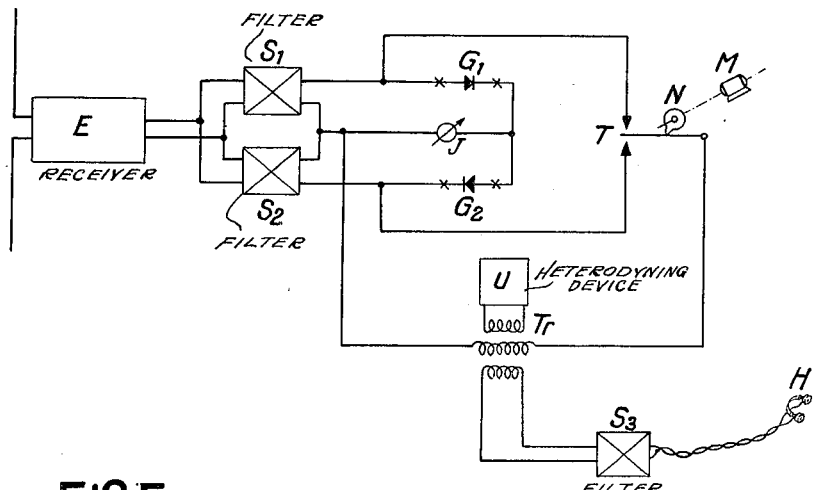
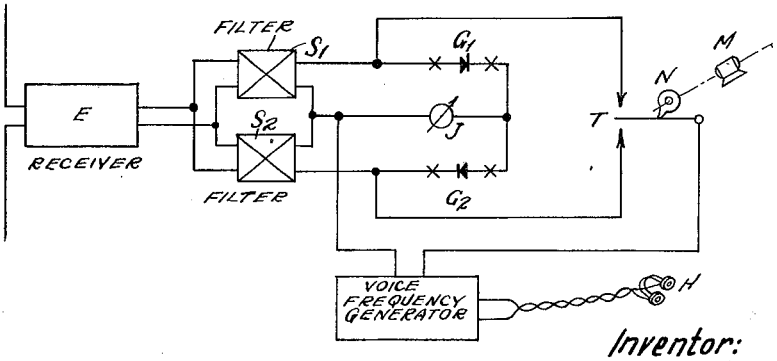
Inventor:
Ernst Kramar
by [signature]
Att'y Sept. 9, 1941.  E. KRAMAR  2,255,741
SYSTEM FOR DETERMINING NAVIGATORY DIRECTION
Filed April 29, 1939  2 Sheets—Sheet 2
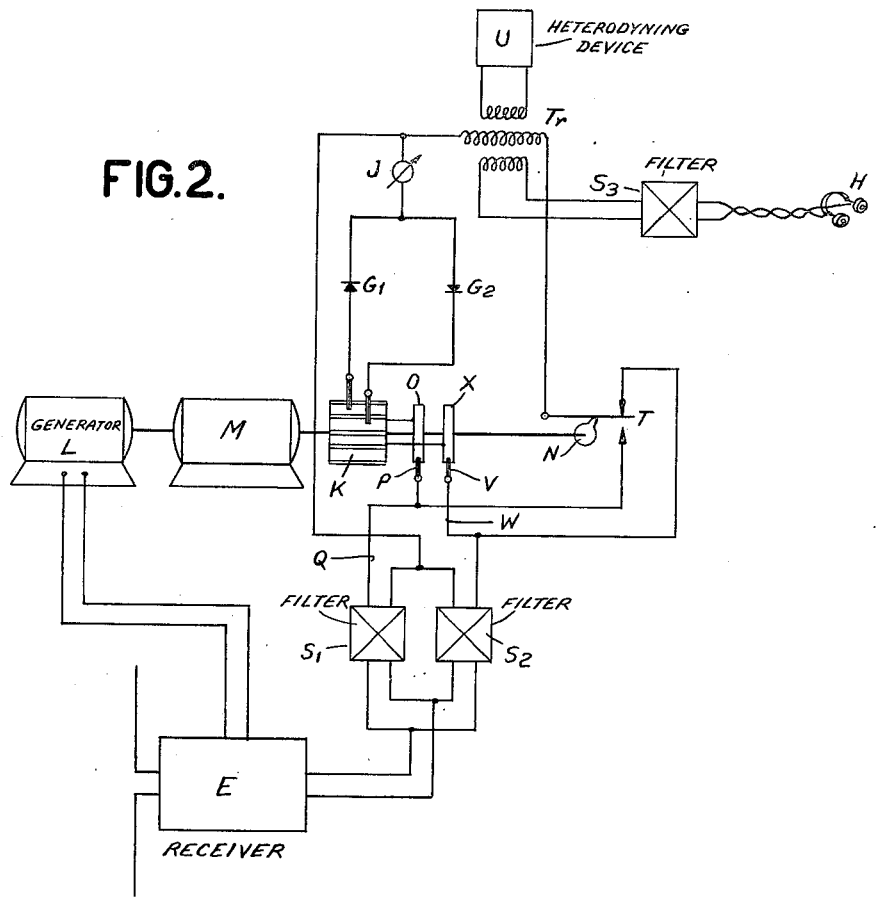
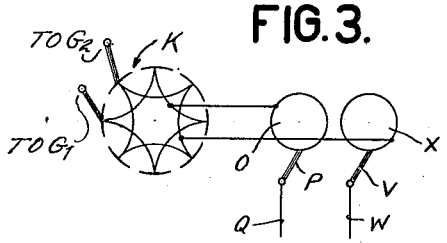
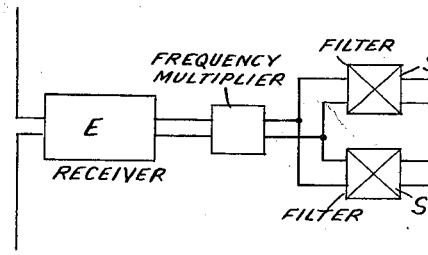
INVENTOR.
Ernst Kramar
BY
E. D. Phinney
ATTORNEY.

Patented Sept. 9, 1941

2,255,741

UNITED STATES PATENT OFFICE 2,255,741

SYSTEM FOR DETERMINING NAVIGATORY DIRECTION

Ernst Kramar, Berlin, Germany, assignor to C. Lorenz Aktiengesellschaft, Berlin-Tempelhof, Germany, a company Application April 29, 1939, Serial No. 270,770
In Germany April 30, 1938

10 Claims. (Cl. 250—11)

For determining navigatory direction radio methods are known in which on the receiving side the field intensities of two differently directive radiation fields or patterns are compared with each other and in which the lines or zones of equal field intensity which are produced by the cooperation of the two radiation patterns serve as guide lines for navigation purposes. In a known method of this kind the radiation patterns are on the transmitting side alternately produced by a keying operation effected in the rhythm of complementary signals and in such manner that the signals of one kind, such as dots or the Morse signal $a$, are produced in the intervals between the signals of the other kind, such as dashes or the Morse signal $n$. In the line of equal field intensity of the two radiation diagrams or patterns these signals complete each other to form an uninterrupted signal spoken of as continuous dash line. On the receiving side this continuous dash line is reproduced by a telephone, in order to be followed as a course line for navigation purposes.

Methods of the kind here referred to require that, in addition to the aural indication effected by the telephone, an optical indication be provided to make the course lines and deviations therefrom visible. In order to perform this, a number of methods have been devised all of which, however, have certain disadvantages. For instance, a known method is such that the two different antenna diagrams are not produced in the rhythm of complementary signals, but are modulated with different tone frequencies. The indication is effected by means of frequency sensitive indicators adapted to respond to the amplitude difference of the two different modulating frequencies. The disadvantage of this method is that only a visual indication is enabled, no aural comparison of the field intensities being possible. It is, however, necessary, for instance on aeroplanes, that in addition to the visual indication an aural comparison be possible, since the pilot has sometimes to observe a plurality of instruments. He will then be able to change from the visual to the aural indication. Also in the case of simultaneous aural and visual indications both are required to cooperate in order to prevent the method lacking reliability due to inaccuracies of indication occurring in one or the other of the indication circuits.

In order to accomplish these results a method has been proposed in which on the transmitting side the keying signals of the different kinds are modulated with discriminative modulating frequencies while on the receiving side the signal-modulating frequencies are on the one hand separated from one another by filter devices and compared with each other by an indicating instrument in order to serve for the visual indication, whereas on the other hand these frequencies in order to serve for the aural indication are heterodyned in a manner to produce equal heterodyne tones, which then are acoustically compared with one another. This method, however, has the disadvantage that the discriminative voice frequencies conveyed to the indicating instrument intended for the visual indication are interrupted, the pointer of this instrument thus jerking in the rhythm of the keying signals. Therefore, the indicating instrument must have such a high inertia or attenuation that the pointer does not respond to quick movements of the vehicle, such as an aeroplane, thus failing exactly to indicate the direction thereof.

In order to overcome these drawbacks, the invention is concerned with a novel method of obtaining aural and visual indications of course lines both at the same time. The characteristic feature of this method is that on the transmitting side the differently directive radiation patterns are modulated with discriminative frequencies while the keying signals that serve for the aural indication are produced on the receiving side.

In connection with the novel method the transmitter hence does not emit keying signals for the so-called side identification, that is, an identification effected by signals which indicate to the pilot whether he is either on the right or left-hand side of the course line to be followed, but shall merely emit discriminative modulating frequencies which on the receiving side are in well known manner separated from one another and are then compared with each other by an indicating instrument adapted for visual indication. In order to provide for aural indication the two discriminative modulating frequencies are according to the invention alternately conveyed to an acoustic apparatus in the rhythm of complementary keying signals, such as the Morse signals $a$, $n$ or dot and dash signals, or the like. In order to enable a perfect aural comparison these keying signals, modulated with discriminative frequencies, are in a manner similar to the prior indicating method so heterodyned that the resultant heterodyne tones equal one another, these being acoustically compared with each other. The simplest manner of heterodyning is such that the same heterodyne means is employed for both modulating frequencies, namely, a heterodyne means whose frequency is so chosen that the summation frequency of one signal equals the differential frequency of the other.

The accompanying drawings illustrate the features of the invention.

In the drawings:

Fig. 1 illustrates diagrammatically a direction finding apparatus constructed in accordance with my invention.

Fig. 2 illustrates a modification of my invention wherein means is provided for rapidly interchanging the rectifiers.

Fig. 3 illustrates in detail the connection of the commutator shown in Fig. 2.

Fig. 4 illustrates a circuit utilizing a frequency multiplier.

Fig. 5 illustrates a modification of my invention in which a local voice frequency generator is controlled by the received signals.

Fig. 6 illustrates a modification of my invention in which the keying of the received signals is caused by a control frequency filtered out of the received signal waves.

Assume by way of example one radiation pattern of the transmitting radio beacon to be modulated with a voice frequency of 800 cycles per second, that is, with 800 hz., and the other radiation pattern to be modulated with a voice frequency of 1200 hz. This result is obtainable with the aid of a single transmitter, for instance, and in such manner that for each radiation field a separate final stage is employed, the modulation in such final stages being effected by means of discriminative voice frequencies. Referring more particular to Fig. 1 the two discriminative modulating frequencies are on the receiving side taken from the output circuit of the receiver E and for the purpose of visual indication are conveyed to filter chains S1, S2 one of which is tuned to 800 hz. while the other is tuned to 1200 hz. Such filter chains act to separate the two modulating frequencies from each other. These are rectified by rectifiers G1, G2 and are then compared with one another by an indicating instrument J. Instrument J either indicates the difference of the two modulating frequencies or, if this instrument is a quotientmeter, indicates the quotient thereof. Since as stated the transmitter does not emit keying signals intended for the said side identification the unidirectional current supplied to the indicating instrument will not be interrupted so that this instrument may be inertialess, thus being able to respond to any deviation from the course line very quickly.

For the purpose of aural indication the discriminative modulating frequencies arising at the output circuit of the filter chains S1, S2 are in accordance with the invention conveyed through a keying device T to a transformer Tr. Device T comprises a contact spring, for instance, which is controlled by a motor M by means of a cam disc N shaped to accord with the desired keying signal. The voice frequencies flowing in the transformer Tr are thus conveyed in the rhythm of complementary keying signals produced on the receiving side but are not yet adapted to be compared with each other since they are of different frequencies. They are, therefore, heterodyned by a suitable device U whose frequency may be assumed here to be 200 hz. Through this heterodyning the following frequencies arise:

Keying signals of one kind: 600 hz., 800 hz., 1000 hz.;

Keying signals of the second kind: 1000 hz., 1200 hz., 1400 hz.

The summation frequency of one signal will thus be equal to the differential frequency of the other signal, namely, 1000 hz. For enabling the aural comparison of the two a filter chain S3, tuned to 1000 hz. and having a telephone H connected to its output circuit, is fitted to the output circuit of the heterodyne means U. This filter chain only allows the frequency of 1000 hz., this being the frequency to be observed, to pass through, while the undesired frequencies of 600, 800, 1200 and 1400 hz. are cut off thereby. The two keying frequencies may now be acoustically compared with each other in the customary manner.

The drive for the keying device T may be a separate motor, such as motor M, or may be the motor-generator provided on board the aeroplane or other vehicle for the purpose of feeding the electron tubes of the receiving apparatus, this motor-generator thus being employed also in connection with the keying here effected on the receiving side.

In the indicating circuit intended for the visual indication inaccuracies may occur if the characteristic curves of the rectifiers G1, G2, included in the two arms of a bridge connection, do not precisely accord with each other. In order to compensate for the asymmetry so occasioned the rectifiers G1, G2 may be interchanged the one for the other at the points indicated by the symbol $x$. This interchanging is effected by means of a switching device as shown in Fig. 2. In accordance with a further feature of the invention this switching device is driven by the drive of the keying device T, that is to say, is driven either by motor M or by the motor-generator of the receiving apparatus.

In Fig. 2 a commutator K is driven by the motor M which also drives keying device T and generator L which supplies the current for the receiver E. Alternate bars of the commutator K are connected together and to a slip ring O on which rests a brush P connected by wire Q to filter S1 while the remaining commutator bars are connected together and to a slip ring X on which rests brush V connected by conductor W with filter S2. The connections between the commutator bars and the slip rings are illustrated in more detail in Fig. 3.

The novel method does not require the modulation effected on the transmitting side to be obtained by means of voice frequencies in the order of magnitude herebefore mentioned. In fact, frequencies considerably lower than these may be employed, such as frequencies amounting to ninety or 150 hz. In this connection the aforesaid mode of modulation effected with the aid of separate final stages may be dispensed with, since with the low frequencies here concerned a modulation, such as the modulation concerned with the reflecting antennae of a radio beacon, may be effected through the medium of rotating condensers driven by a motor common to them or by two separate synchronous motors. However, as it is difficult acoustically to compare these low voice frequencies with each other on the receiving side, a further feature of the invention proposes to effect a frequency multiplication. For instance, such multiplication may be obtained by using for the aural comparison harmonics of the modulating frequencies of the transmitter. These harmonics may be obtained by a frequency multiplier as shown in Fig. 4.

Alternatively, the aural comparison of the discriminative voice frequencies may be effected as shown in Fig. 5 with the aid of a local voice frequency generator provided on the receiving side and the amplitude of which is controlled by the received modulating frequencies after rectification of these. This case hence is not concerned with a direct listening to the transmitter modulation but deals with the listening to a local voice frequency whose amplitude is proportional to the received modulating frequencies keyed on the receiving side in the rhythm of complementary signals.

In order to save on the transmitting side the separate final stages intended for the discriminative modulation of the two directional antenna fields the arrangement may be such that these fields are not produced both at the same time but are generated alternately in the rhythm 1:1, that is to say, are produced by the so-called change-over keying. The frequency of this change-over keying is made to be such that on the receiving side the indicating device is not affected and that further this frequency shall not coincide with the keying frequency of the receiver. Such change-over keying, however, has nothing to do with a change-over keying intended for the said side identification but merely serves to simplify the transmitting arrangement. This arrangement then is so constructed that the modulation tone of the transmitter is likewise changed over, namely in the rhythm of the change-over keying by which the directive antenna fields are influenced.

In order to simplify the apparatus on board the vehicle a further feature of the invention proposes to replace the mechanically driven keying arrangement T,N of the receiver by a keying relay controlled from the transmitter by wireless as illustrated in Fig. 6. In this figure the relay R is controlled by an additional modulating frequency derived from a special filter S—4. This modulating frequency has nothing to do with those modulating frequencies that serve for the said side identification. Such additional modulating frequency is produced by a keying operation effected in the rhythm of keying signals and is filtered out in the receiver, being used here for controlling the said keying relay.

What is claimed is:

1. In a radio beacon guiding system of the type employing a plurality of directive radiations modulated at different frequencies and intersecting at predetermined points forming a course, a course indicating system comprising a receiver for detecting and demodulating the energy of said radiations, means connected to said receiver for separating the signals of different frequencies obtained by said demodulation, means for audibly detecting said signals and means for periodically connecting said detecting means to each of said separating means at a predetermined rate.

2. In a radio beacon guiding system of the type employing a plurality of directive radiations modulated at different frequencies and intersecting at predetermined points forming a course, a course indicating system comprising a receiver for detecting and demodulating the energy of said radiations, means connected to said receiver for separating the signals of different frequencies obtained by said demodulation, a visual indicator connected to said means responsive to the intensity of said signals, means for audibly detecting said signals and means for periodically connecting said detecting means to each of said separating means at a predetermined rate.

3. In a radio beacon guiding system of the type employing a plurality of directive radiations modulated at different frequencies and intersecting at predetermined points forming a course, a course indicating system comprising a receiver for detecting and demodulating the energy of said radiations, means connected to said receiver for separating the signals of different frequencies obtained by said demodulation, means for audibly detecting said signals comprising a source of signals coupled to said separating means having a frequency adapted to produce a common beat frequency with all of said first signals, and means for connecting said detecting means to each of said separating means at a predetermined rate.

4. In a radio beacon guiding system of the type employing a plurality of directive radiations modulated at different frequencies and intersecting at predetermined points forming a course, a course indicating system comprising a receiver for detecting and demodulating the energy of said radiations, means connected to said receiver for separating the signals of different frequencies obtained by said demodulation, means for audibly detecting said signals comprising a source of signals coupled to said separating means having a frequency adapted to produce a common beat frequency with all of said first signals and means for passing only said common beat frequency, and means for periodically connecting said detecting means to each of said separating means at a predetermined rate.

5. A course indicating system according to claim 1, wherein said connecting means is operated by signals from the source of said radiation pattern.

6. In a radio beacon guiding system of the type employing a plurality of directive radiations modulated by signals of different frequencies and intersecting at predetermined points forming a course, a course indicating system comprising a receiver for detecting and demodulating the energy of said radiations, filters connected to the output of said receiver for separating the signals of different frequencies obtained by said demodulation, an indicating meter, rectifiers connected to the outputs of said filters and in series with said indicating meter, a source of signals for obtaining beat frequency signals with said first signals, a filter for passing only a beat frequency common to all of said signals, switching means for periodically connecting said signal source and said last filter to said separating filters at a predetermined rate, and means for producing audible signals connected to said last filter.

7. A course indicating system according to claim 6, wherein switching means is provided for interchanging the connections of said rectifiers.

8. In a radio beacon guiding system of the type employing a plurality of directive radiations modulated at different frequencies and intersecting at predetermined points forming a course, a course indicating system comprising a receiver for detecting and demodulating the energy of said radiations, a plurality of means, one for each signal, connected to said receiver for obtaining signals at harmonic frequencies of the signals obtained by said demodulation, a visual indicator connected to said means and responsive to the intensity of said harmonic signals, means for audibly detecting said harmonic signals, and means for periodically connecting said detecting means to each of said first means at a predetermined rate.

9. A course indicating system according to claim 8, wherein said means for obtaining signals at harmonic frequencies comprise filters adapted to pass said harmonic frequencies.

10. In a radio beacon guiding system of the type employing a plurality of directive radiations modulated at different frequencies and intersecting at predetermined points forming a course, a course indicating system comprising a receiver for detecting and demodulating the energy of said radiations, filters connected to said receiver for separating the signals of different frequencies obtained by said demodulation, a visual indicator connected to said filters responsive to the intensity of said signals, means connected to said receiver for obtaining signals at harmonic frequencies of the signals obtained by said demodulation, means for audibly detecting said harmonic signals, and switching means for periodically connecting said detecting means to each of said harmonic signal means at a predetermined rate.

ERNST KRAMAR.